Figure 1:
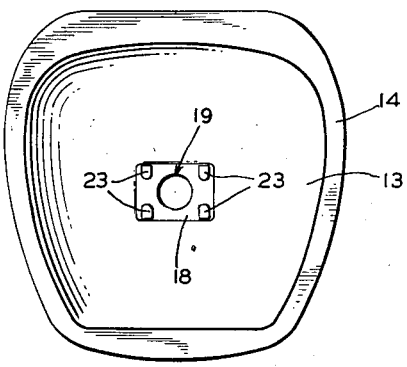

Jan. 22, 1957  L. C. CARISSIMI  2,778,486
COMBINED CORD SPOOL AND SHAVER SUPPORT
Filed July 2, 1954

INVENTOR.
LOUIS C. CARISSIMI
BY Clyde A. Morton
Roland T. Booth
ATTORNEYS 2,778,486
Patented Jan. 22, 1957

United States Patent Office

2,778,486
COMBINED CORD SPOOL AND SHAVER SUPPORT

Louis C. Carissimi, Fairfield, Conn., assignor to Sperry Rand Corporation, a corporation of Delaware Application July 2, 1954, Serial No. 441,054

2 Claims. (Cl. 206—16)

This invention relates to electric shaver carrying cases and particularly to a combination shaver support and electric cord spool for use in a carrying case.

To those who have had occasion to use small electric appliances and their associated cords, which are usually disposed in small cases, the time and effort involved in unwrapping the cord and thereafter of disposing it again into the case is a familiar experience. Such an appliance may well be an electric shaver, the associated cord of which has long been a problem especially to travellers.

The main object of this invention is to provide a simple and efficient unitary support for an electrical appliance and its associated cord wherein the cord can be quickly and easily disposed on the support to be stowed away in its case and as easily and quickly removed therefrom for use with the associated appliance such as an electric shaver.

A further object is to provide a device as above set forth, which can be made of stamped metal parts and assembled by mass production methods with a maximum of economy.

A still further object is to provide a combination support unit and a carrying case in which the structure of the case permits the ready and quick insertion of the device into and removal from the case.

Yet another object is to provide a support for the cord so related to the casing in which it is housed that the cord is held therein snugly whereby it does not become snarled or ravelled while disposed therein no matter how much the casing is tossed about in a suit case or similar traveller's luggage.

Further and more specific features, objects, and advantages will more clearly appear from a consideration of the specification hereinafter set forth especially when taken in connection with the accompanying drawings which illustrate a present preferred form of the invention and which form part of the specification.

In brief and general terms, the invention comprises a supporting plate for the appliance, to the under face of which is fixed a spool on which the cord may be wound. The periphery of the supporting plate and the spool flanges are shaped to fit snugly within a compartment forming the lower portion of the carrying case which is as usual provided with a pivoted cover. The hub of the spool is made with an opening into which one end of the cord may be disposed to hold it while the cord is being wound up on the spool. The hub and associated plates have alined holes into which the finger of the user may be inserted to hold the spool firmly while the cord is being wound thereon or unwound therefrom.

A further particular concerns an opening at the bottom of the casing to expose a portion of the bottom plate of the inserted unit whereby the user's finger may be inserted to lift the contained unit sufficiently out of the casing so that its upper portion may be gripped in the hand of the user and withdrawn readily from the casing.

Figure 2:
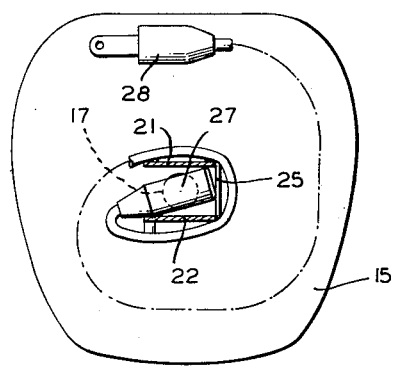
Figure 3:
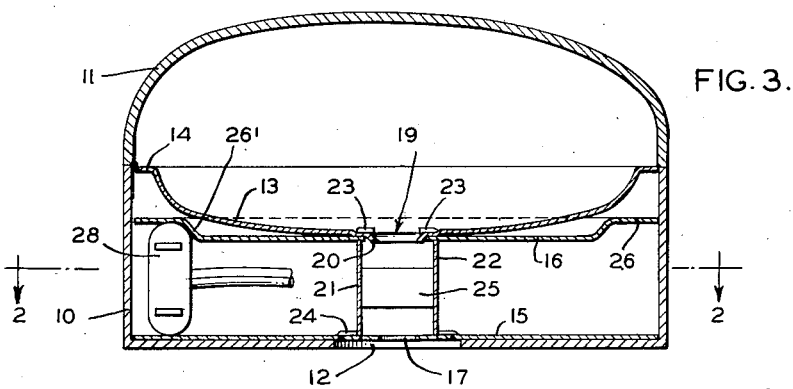
Figure 4:
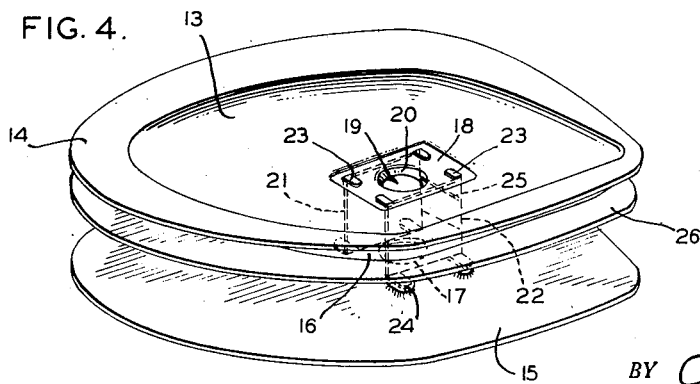
Figure 5:
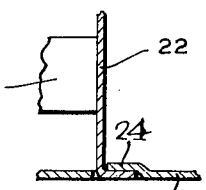

A present preferred form which the invention may assume is shown in the drawings of which, Fig. 1 is a plan view of the supporting unit;
Fig. 2 is a horizontal section taken on the line 2—2 of Fig. 3, showing the general manner in which the cord is disposed within the spool;
Fig. 3 is a vertical section taken through the casing and the unit housed therein generally taken along the line 3—3 of Fig. 1;
Fig. 4 is a perspective view of the supporting unit; and
Fig. 5 is a detail section of the manner of connecting the hub to the spool plates.

Referring now merely to the specific preferred form of the invention shown in the drawings, there is shown a casing formed with a lower chamber 10 housing the supporting unit, and provided with a pivoted cover 11. The bottom wall of the casing is provided with an aperture 12 to expose a portion of the housed unit.

The supporting unit comprises a supporting plate 13 of concave form to conform to the curvature of the appliance to be disposed on it. The outer edge of the plate 13 is in the form of a flat flange 14 and its periphery is shaped to conform snugly to the inner shape of the chamber 10 of the casing and preferably lying in a plane flush with the upper edge of the chamber as shown in Fig. 3.

Disposed below the supporting plate 13 and fixed thereto is a cord spool formed of two plates 15 and 16 of preferably stamped metal. The lower plate is flat and has a small aperture 17 therein alined with the aperture 12 in the casing.

As will be seen in Fig. 4 the supporting plate 13 has a central depressed portion 18 preferably rectangular in shape and in the center of this portion is an aperture 19 outlined by the slightly downwardly turned edges 20 of the plate 13.

The hub of the spool is formed of spaced plates 21 and 22 the upper and lower corners of which are provided with integral ears 23. The upper ears 23 pass through slits in the plates 13 and 16 and are bent over as shown in Figs. 3 and 4 to hold these plates and the hub member together. The lower ears 23 are bent to lie under raised lips 24 of the lower plate 15 as shown in Fig. 5. The two plates 21 and 22 are connected across between two adjacent edges by means of a strap 25 which is disposed midway the height of these plates. The outer periphery of the upper spool plate 16 is raised from the level of the main portion thereof and forms a flat peripheral flange 26. This plate 16 at least is made of spring metal so that when the male end of the cord is disposed beneath it as shown in Fig. 3 there will be a slight pressure on this end to hold it in position. The sloping surface 26' formed between the main portion of plate 16 and the raised peripheral flange will tend to position the male member 28.

Let it be assumed that the user has been shaving and has disconnected the cord from the shaver. In order to stow the shaver and the cord away he pushes his finger up into the aperture 12 of the casing and this lifts the upper plate 13, with the cover 11 open, so that it can be grasped in the hand and lifted out of the casing. He then holds the spool in his left hand with a finger in the aperture 19 and places the female end 27 of the cord in the housing space between the plates of the spool hub. With his right hand he rotates the spool around thus winding up the cord on the spool. The male end 28 of the cord is then gently pressed into the space between the upper and lower plates 15 and 16. The unit is then inserted into the casing and the shaver then placed on top of the plate 13 and the cover closed. To remove the elements from the casing the above operations are substantially reversed.

It can thus be readily perceived that there has been provided a simple, compact, inexpensive and efficient supporting unit for a shaver and its associated cord which can readily and quickly be inserted into and removed from the associated casing and on to which the cord may be efficiently and easily wound and from which it can as readily be unwound without any chance of it being ravelled or snarled up while being wound or unwound or while in the casing.

While there is above described but one embodiment of the invention, it is possible to produce still other embodiments without departure from the inventive concept above disclosed, and it is, therefore, desired that only such limitations shall be imposed on the apended claims as are stated therein.

What I claim as new, and desire to secure by Letters Patent, is:

1. A unitary device for supporting an appliance and its associated cord, which comprises an appliance-supporting plate curved to the shape of the appliance, a cord spool integrally connected therebelow and comprising spaced plates and a connecting hub, said hub comprising spaced plates with ears at the upper and lower corners thereof, the spool plates and the supporting plate having slits therein through which the ears pass and are bent over to hold the hub plates and the other plates together as a unit, and a strap lying in a plane perpendicular to said spool plates and said hub plates and connecting two adjacent edges of the hub plates.

2. A unitary device for supporting an appliance and its associated cord, which comprises an appliance-supporting plate curved to the shape of the appliance, a cord spool integrally connected therebelow and comprising spaced plates and a connecting hub, said hub comprising spaced plates with ears at the upper and lower corners thereof, the spool plates and the supporting plate having slits through which the ears pass and are bent over to hold the hub plates and the other plates together as a unit, and a strap lying in a plane perpendicular to said spool plates and said hub plates and connecting two adjacent edges of the hub plates, the spool plate adjacent the appliance-supporting plate having an elevated peripheral flange and made of spring metal whereby the connector end of the cord may be received between the flange and the other plate of the spool under resilient pressure and is limited in position by the slope between the elevated flange and the remainder of the plate.

References Cited in the file of this patent

UNITED STATES PATENTS

| 1,429,692 | Passavanti | Sept. 19, 1922 |
| 1,772,102 | Lewis | Aug. 5, 1930 |
| 1,799,994 | Sternberg | Apr. 7, 1931 |
| 2,667,966 | Jepson et al. | Feb. 2, 1954 |

FOREIGN PATENTS

| 370,203 | France | Dec. 12, 1906 |

OTHER REFERENCES

Gillette Advertisement, Washington Star, p. 21, Nov. 27, 1938.